US005988849A

United States Patent [19]

Engelhardt

[11] Patent Number: 5,988,849

[45] Date of Patent: Nov. 23, 1999

[54] DEVICE AND PROCESS FOR CONTROLLING THE MOVEMENT OF AN OBJECT

[75] Inventor: Johann Engelhardt, Bad Schoenborn, Germany

[73] Assignee: Leica Lasertechnik GmbH, Heidelberg, Germany

[21] Appl. No.: 08/817,699

[22] PCT Filed: Oct. 24, 1995

[86] PCT No.: PCT/DE95/01479

§ 371 Date: May 1, 1997

§ 102(e) Date: May 1, 1997

[87] PCT Pub. No.: WO96/16360

PCT Pub. Date: May 30, 1996

[30] Foreign Application Priority Data

Nov. 19, 1994 [DE] Germany ............................ 44 41 240

[51] Int. Cl.[6] ............................ G05B 19/18; G05B 3/02

[52] U.S. Cl. ................ 364/167.02; 364/162; 364/167.07

[58] Field of Search ......................... 364/167.02, 148.06, 364/148.09, 162, 167.07; 395/80, 88, 96

[56] References Cited

U.S. PATENT DOCUMENTS

| | | | |
|---|---|---|---|
| 4,985,668 | 1/1991 | Nakazumi et al. | 318/568.2 |
| 5,159,250 | 10/1992 | Jeon et al. | 318/568.11 |
| 5,159,254 | 10/1992 | Teshima | 318/611 |
| 5,371,836 | 12/1994 | Mitomi et al. | 395/80 |
| 5,432,422 | 7/1995 | Nagano et al. | 318/611 |

*Primary Examiner*—Paul P. Gordon
*Attorney, Agent, or Firm*—Foley & Lardner

[57] ABSTRACT

In the movement of objects, especially benches or robot arms, on a programmed path, the object must be moved into a new position as fast and as smoothly as possible. To this end, the control device of the invention has a compensating unit 17 employing a movement equation describing the state of the system as a reference value Y. At the same time, deviations are controlled by a regulating unit (19). The regulating unit (19) is thus more dynamic and automatically compensates for changes locally and in time in the system parameters.

13 Claims, 3 Drawing Sheets

DEVICE AND PROCESS FOR CONTROLLING THE MOVEMENT OF AN OBJECT

FIELD OF THE INVENTION

The invention relates to a device for controlling the movement of an object according to the features described below Furthermore, the invention relates to a process according to the features described below.

DESCRIPTION OF RELATED ART

It is customary to use PID controllers in controlling actuators for positioning objects which are moved on a prescribed path. Under constant or linear conditions, good control results can be achieved using the said PID controllers. Since the system (controlled system) frequently does not behave linearly, for example if the nonlinearities occur as a consequence of friction effects or when an object is picked up by a robot arm, the parameters of the system (controlled system) vary as a function of location and time. The nonlinearities occurring give rise to inaccuracies in the path movement of the object.

SUMMARY OF THE INVENTION

An object of the invention is to specify a device and a process such that a precise and fast movement of the object on a preprogrammed path is rendered possible.

The technical problem is solved by the features described below.

The invention has a compensation unit in which an equation of motion characterizing the system is continuously solved. The forces acting on the system or the controlled system are thus continuously determined in the compensation unit and summed to form a compensation variable. This compensation variable then acts directly on the system (controlled system) as a manipulated variable. An idealization of the system occurs by virtue of the fact that the compensation variable acts directly on the controlled system. Specifically, the forces acting on the object are continuously compensated, with the result that the controller unit needs to adjust only the changes imposed by the reference variable. The control range of the controller unit is thus relatively small. A more precise and faster path movement of the object from one location to another location is rendered possible by the compensation of forces produced in the compensation unit. The range of the permissible speeds of the object is enhanced.

The controller dynamics are thus enhanced by the invention. Moreover, local and temporal variations in the system parameters are automatically compensated.

According to a development of the invention, the output variable of the position detector is fed as a controlled variable to a comparator unit, on the one hand, and to the input of the compensation unit, on the other hand. The controller unit and the compensation units are arranged in parallel with one another, the output variables of the controller unit and of the compensation unit being added in an adder unit to form a manipulated variable.

According to one embodiment of the invention, the controller unit has a digital controller, preferably a PID controller. Both the controller unit and the compensation unit are a component of a digital computer.

According to a further embodiment of the invention, the reference variable is prescribed in the reference variable unit in such a way that the manipulated variable is designed to be free from step changes or breaks. The temporal characteristics of the manipulated variable preferably correspond to a Gaussian bell shape. Smooth operation of the object to be moved is thereby rendered possible. In particular, only a low proportion of vibrations are transmitted to the object in the case of rapid accelerations.

Further advantageous embodiments of the invention follow.

BRIEF DESCRIPTION OF THE DRAWINGS

Exemplary embodiments of the invention are represented in the drawings and are described in more detail below.

DETAILED DESCRIPTION OF THE PREFERRED EMBODIMENT

Figure 1:
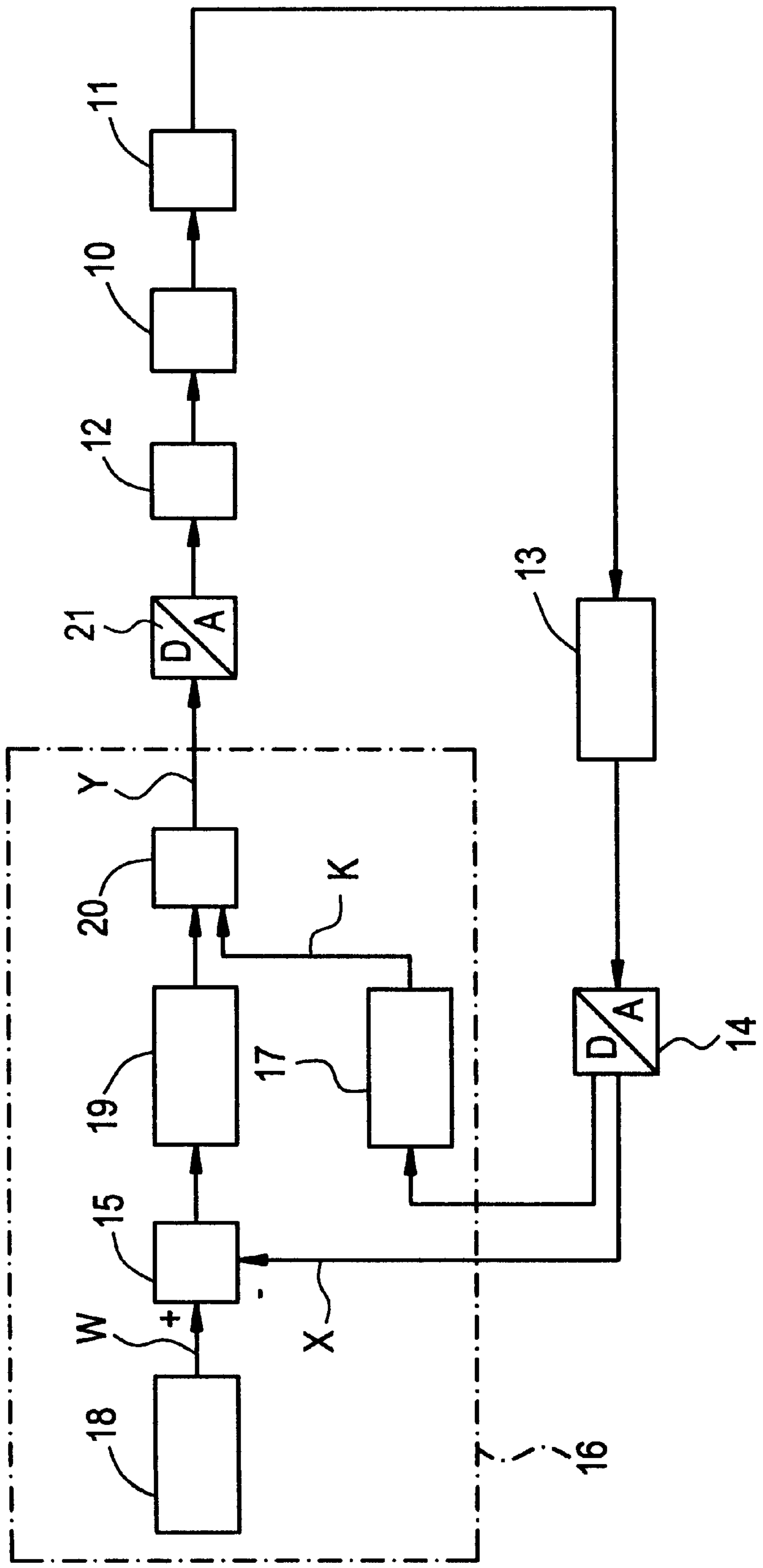
FIG. 1 shows a block diagram of a first exemplary embodiment of the invention.

FIG. 1 represents a first exemplary embodiment of the invention. The invention has an actuator 10 as a drive unit, which moves a table 11, for example a microscope stage, on a prescribed path from a location $x_1$ to a location $x_2$. The actuator 10 is designed as a DC motor and is fed with a current proportional to the output torque. A position detector 13, which can be designed as an incremental shaft encoder, a glass scale or interferometer, detects the current position of the table 11. The position values measured by the position detector 13 are fed as controlled variable X via an analog-to-digital converter 14 to a comparator unit 15, on the one hand, and to a compensation unit 17, on the other hand. In the comparator unit 15, the controlled variable X is subtracted from the reference variable W output by a reference variable unit 18. The reference variable unit 18 serves the purpose of converting the manually input target position $x_2$ in to a digital voltage value and feeding it as reference variable W to the comparator unit 15. The system deviation determined by the comparator unit 15 is fed to a controller unit 19. The controller unit 19 has a digital controller in the form of a PID algorithm. Depending on the individual case, it is also possible to use further customary control algorithms such as, for example, P algorithms or PI algorithms, in order to correct a path error. The output variable of the controller unit 19 is fed to an adder unit 20 in which it is added to a compensation variable K output by the compensation unit 17.

The equation of motion characterizing the system or the controlled system is continuously solved in the compensation unit 17, and the forces counteracting the movement of the table 11 are determined. The sum of these forces is fed as compensation variable K to the adder unit 20.

The compensation variable K can be determined after three time interval steps T on the basis of a differential equation of second order.

$$f(x)=a+bx+c\dot{x}+d\ddot{x}$$

where a represents a constant force, for example the force due to weight, b a spring constant, c a friction coefficient and d the mass of the table 11, and x specifies the location of the table 11. It follows after conversion of the differential equation into a difference equation from:

$$f_N = a + bx_N + \frac{c}{T}(x_N - x_{N-1}) + \frac{d}{T^2}(x_N - 2x_{N-1} + x_{N-2})$$

To obtain the compensation variable K, location $x_1$ is determined after a first time interval T. After a further time interval T, the position detector 13 supplies a further location value $x_2$, from which the instantaneous speed can be calculated by forming the difference in relation to the location $x_1$ for a known time interval T. The acceleration can be determined after a further time interval T. By continuously measuring the position of the table 11 and simultaneously solving the difference equation of the controlled system, it is possible to determine continuously the compensation variable K which ensures that the system attempts to maintain the instantaneous state of movement. The effect of this is that the added output variable of the controller unit 19 can be small and this encounters an apparently ideal system free from forces.

The manipulated variable Y output by the adder unit 20 is fed to a digital-to-analog convertor 21, which gives the manipulated variable Y an analog form and feeds it to a driver 12 which preferably operates as a voltage-controlled current source and converts the voltage value of the manipulated variable Y in to a current value proportional to the torque.

Controlling or regulating the table 11 is therefore performed in a digital way. Both the controller unit 19, the compensation unit 17 and the reference variable unit 18' are a component of a digital computer 16. Simple correction of the path error is rendered possible in this way.

Figure 2:
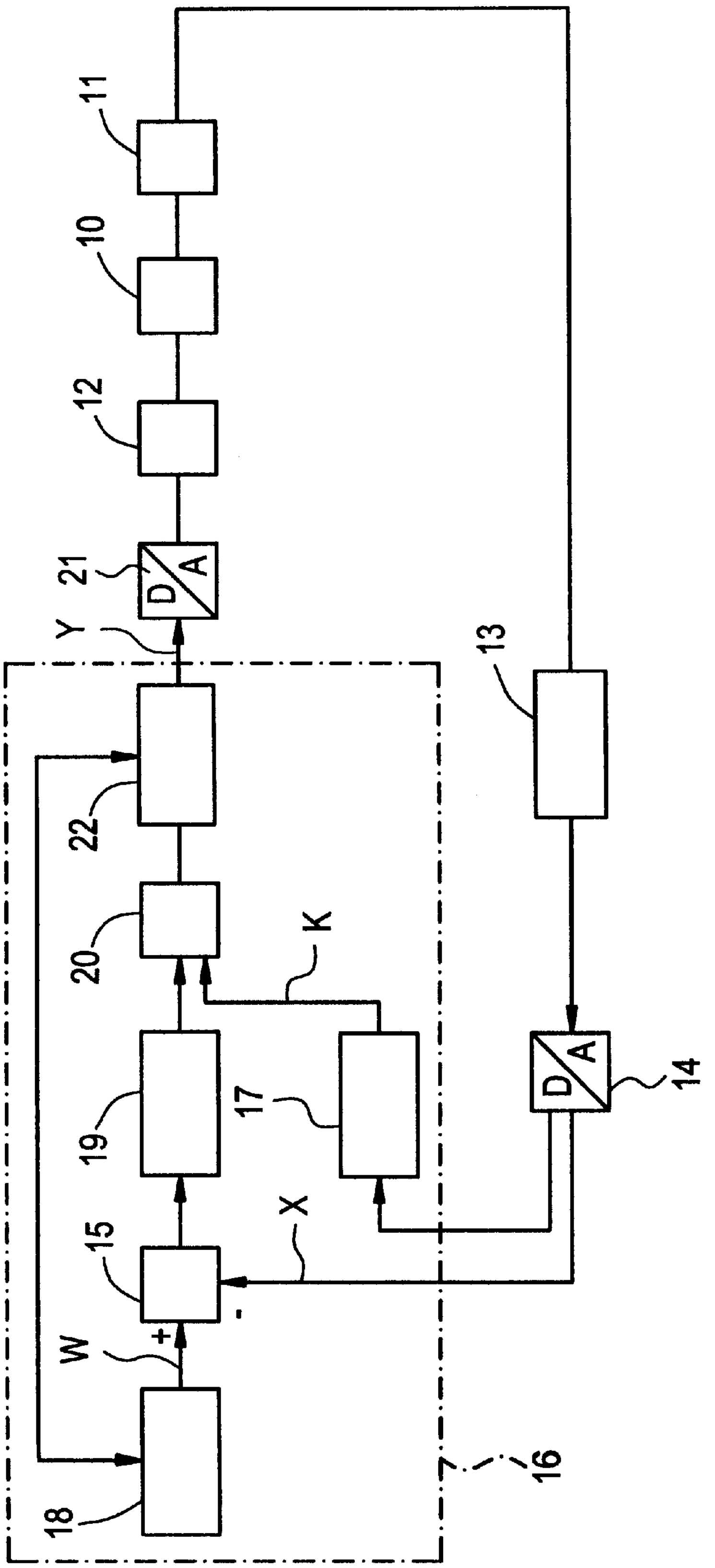
FIG. 2 shows a block diagram of a second exemplary embodiment of the invention.

According to a second exemplary embodiment in accordance with FIG. 2, the invention additionally has an actuating unit 22. The components represented in FIG. 2 that correspond to the respective components of the first exemplary embodiment have the same reference symbols.

Figure 3A:
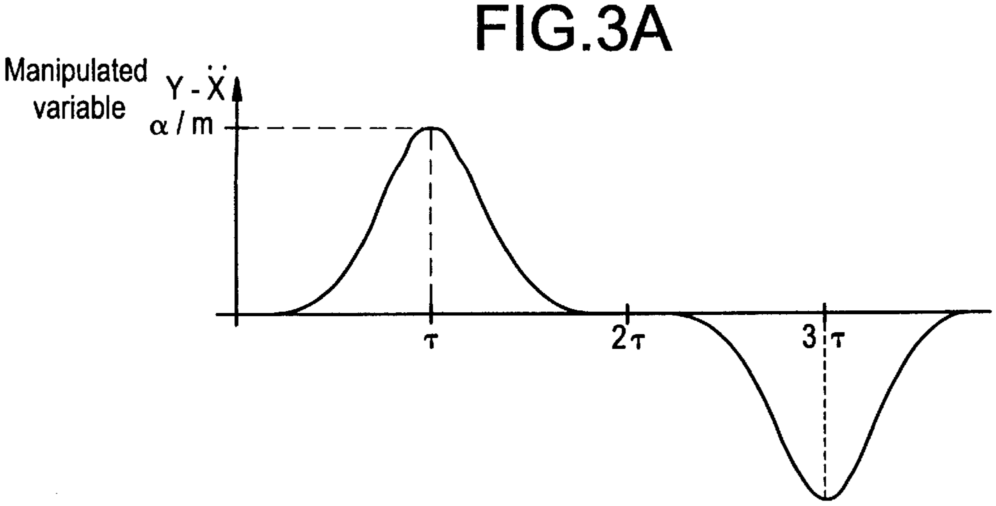
FIG. 3 shows the temporal characteristics of the manipulated variable, of the speed and of the location in the case of the movement of an object from a location $x_1$ to a location $x_2$.

The actuating unit 22 generates a manipulated variable Y which has the form of a Gaussian bell curve. As is to be seen from FIG. 3*a*, the manipulated variable comprises a positive and a negative pulse, which are free from step changes or breaks. Because of the fact that the temporal characteristic of the manipulated variable Y is designed to be free from step changes, the control algorithm generated in the controller unit 19 is prevented from being destabilized, on the one hand, and additional system vibrations as a consequence of step changes in force are prevented from occurring, on the other hand. A smooth movement of the table 11 is effected thereby. The smoothness of the movement of the table 11 is particularly important when the table 11 is a heavy microscope stage.

The equations for the manipulated variable Y, which is proportional to the acceleration $\ddot{x}$ . . . , as well as the speed $\dot{x}$ . . . and the path x are yielded as:

$$\ddot{x}(t) = \frac{\alpha}{m}\left(\exp^{-\left(\frac{t+\tau}{\beta}\right)^2} - \exp^{-\left(\frac{t-\tau}{\beta}\right)^2}\right)$$

$$\dot{x}(t) = \frac{\sqrt{\pi}\,\alpha\beta}{2m}\left[\operatorname{erf}\left(\frac{t+\tau}{\beta}\right) - \operatorname{erf}\left(\frac{t-\tau}{\beta}\right)\right]$$

$$x(t) = \frac{\sqrt{\pi}\,\alpha\beta^2}{2m}\left[\frac{2\tau}{\beta} + \left(\frac{t+\tau}{\beta}\right)\operatorname{erf}\left(\left(\frac{t+\tau}{\beta}\right)\right) - \left(\frac{t-\tau}{\beta}\right)\operatorname{erf}\left(\left(\frac{t-\tau}{\beta}\right)\right) + \frac{1}{\sqrt{\pi}}\left(\exp^{-\left(\frac{t+\tau}{\beta}\right)^2} - \exp^{-\left(\frac{t-\tau}{\beta}\right)^2}\right)\right]$$

m=mass

α=acceleration parameter

β=force pulse width

τ=distance between acceleration and breaking pulses erf() Abramowitz error function, "Handbook of Mathematical Functions", Precision: 3e-7, Dover Publications Inc., New York 1970, pp [sic] 235.

Figure 3B:
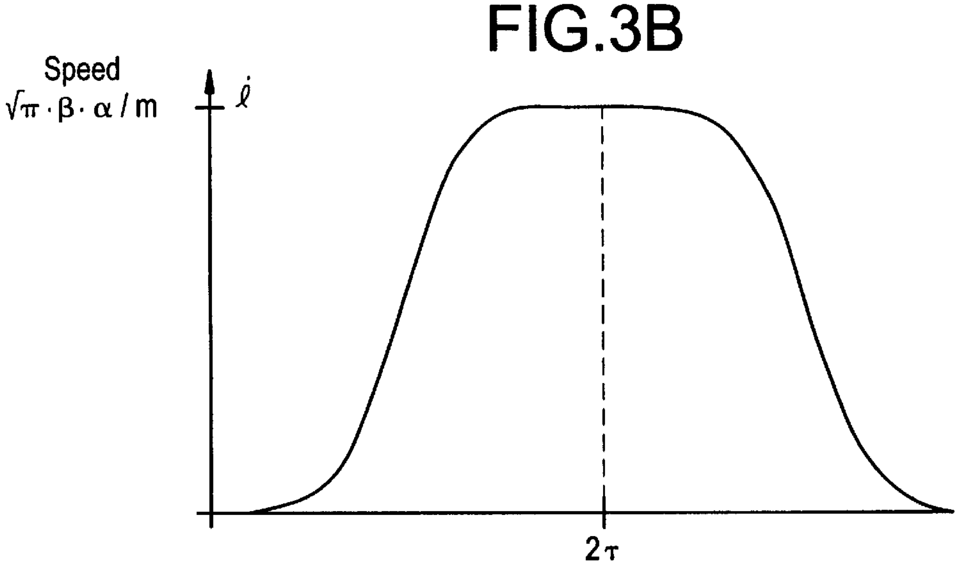
Figure 3C:
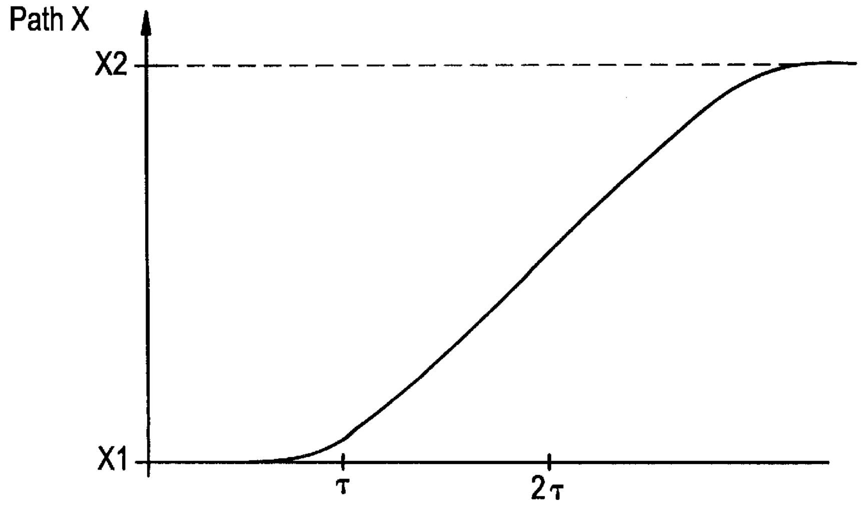

The maximum speed which can be achieved is yielded by stipulating the force pulse width β and the acceleration parameters, see FIG. 3*b*. The path length covered between location $x_1$ and location $x_2$ can be set by setting the value τ. The temporal characteristic of the location can be determined in accordance with FIG. 3*c* from the characteristic of the manipulated variable Y by integrating twice. After the desired target location $x_2$ has been input, this local function is handed over to the reference variable unit 18 and output in the latter as reference variable function. The deviations from the desired path are then corrected by the controller unit 19.

Moreover, the reference variable W can also be designed in the shape of a bell of the type of a Gaussian bell shape in the reference unit 18. The actuating unit 22 could thereby be eliminated.

As an alternative to this, the characteristic of the location could be formed by juxtaposing straight lines. A form of the manipulated variable Y free from step changes would likewise be yielded by subsequent filtering in a low path filter.

The temporal characteristics of the manipulated variable Y, the speed and the location are preferably determined by means of a computer program in a digital computer.

The invention achieves a largely smooth movement, in particular for tables, robots and focussing drives in microscope systems or camera controllers. The invention can be used wherever objects are to be moved as quickly and smoothly as possible on a programmed path.

I claim:

1. A device for controlling the movement of an object on a prescribed path, comprising:

- a drive unit for driving the object;
- a position detector for measuring a current position of the object;
- a comparator unit for subtracting a controlled variable detected by the position detector from a reference variable;
- a controller unit downstream of the comparator unit, and
- a compensation unit which receives a signal from the position detector at short time intervals and in which at least one equation of motion describing a state of the system (controlled system) is continuously solved therefrom by a microprocessor such that the equation of motion is solved at least in accordance with a number of time intervals corresponding to its order, and
- wherein the sum of a plurality of forces acting on the system (controlled system) is determined for the purpose of forming a compensation variable, and wherein this compensation variable is fed to the system (controlled system) as a component of a manipulated variable, as a result of which the forces acting on the system (controlled system) are compensated and a system (controlled system) which is virtually free from force for the control variable is thereby produced.

2. A device according to claim 1, wherein an output variable of the controller unit and an output variable (compensation variable K) of the compensation unit are added in an adder unit for the purpose of forming the manipulated variable.

3. A device according to claim 1, wherein the controlled variable (X) forms an input variable of the compensation unit.

4. A device according to claim 1, wherein the controller unit and the compensation unit are of digital design and are arranged in a single digital computer.

5. A device according to claim 1, wherein a reference variable unit is arranged in which a reference variable (W) is formed in such a way that a temporal characteristic of the manipulated variable (Y) added to the system (controlled system) is free from step changes or breaks.

6. A device according to claim 1, wherein the reference variable in a reference variable unit is formed in such a way that the manipulated variable varies in a shape of a bell with time.

7. A device according to claim 1, wherein the reference variable in a reference variable unit is formed in such a way that the manipulated variable varies in a shape of a Gaussian bell curve.

8. A process for controlling the movement of an object, on a prescribed path, the object being driven by a drive unit, a current position of the object being measured by a position detector and fed as a controlled variable (X) to a comparator unit in which the controlled variable (X) is subtracted from a reference variable (W) and subsequently fed to a controller unit, wherein a position of the object is measured with the aid of the position detector at short time intervals and thereby the actual movement of the object is continuously detected, and wherein a plurality of forces counteracting a manipulated variable are continuously determined therefrom in a compensation unit by solving an equation of motion of a system (controlled system), the equation of motion of the system (controlled system) being solved at least in accordance with a number of time intervals corresponding to its order, and wherein there is formed continuously therefrom a compensation variable which contributes to the formation of the manipulated variable and thereby acts on the system (controlled system) and produces a system (controlled system) which is virtually free from force for the controlled variable.

9. A device according to claim 8, wherein an output variable of the controller unit and an output variable of the compensation unit are added in an adder unit for the purpose of forming the manipulated variable.

10. A device for controlling movement of an object in a system, comprising:

a position detector for measuring a current position of the object;

a comparator unit for subtracting a controlled variable detected by said position detector from a reference variable;

a compensation unit in which an equation of motion for the system is continuously solved based on measurements received from said position detector;

a controller unit downstream of the comparator unit; and an adder unit for adding an output from said controller unit to an output from said compensation unit.

11. A device for controlling movement of an object in a system as claimed in claim 10, wherein the system is a microscope system.

12. A device for controlling movement of an object in a system as claimed in claim 10, wherein the system is a camera system.

13. A process for controlling movement of an object, comprising:

detecting a position value of the object with a position detector;

feeding said position value as a control variable via an analog-to-digital converter to a comparator unit and a compensation unit;

determining a system deviation in said comparator unit by subtracting said control variable from a reference variable output by a reference variable unit;

determining an output variable in a controller unit from said system deviation;

determining a manipulated variable in an adder unit which is the sum of said output variable and a compensation variable output by said compensation unit, wherein said compensation variable is a sum of a plurality of forces counteracting the movement of the object and is determined by continuously solving an equation of motion characterizing a system;

converting said manipulated variable to analog form in a digital-to-analog converter; and converting, in a driver, a voltage value of said manipulated variable into a current value that is proportional to a torque acting on the object.

* * * * *